Aug. 1, 1933.  W. S. REED  1,920,524
COUPLING
Original Filed Sept. 3, 1929   3 Sheets-Sheet 1
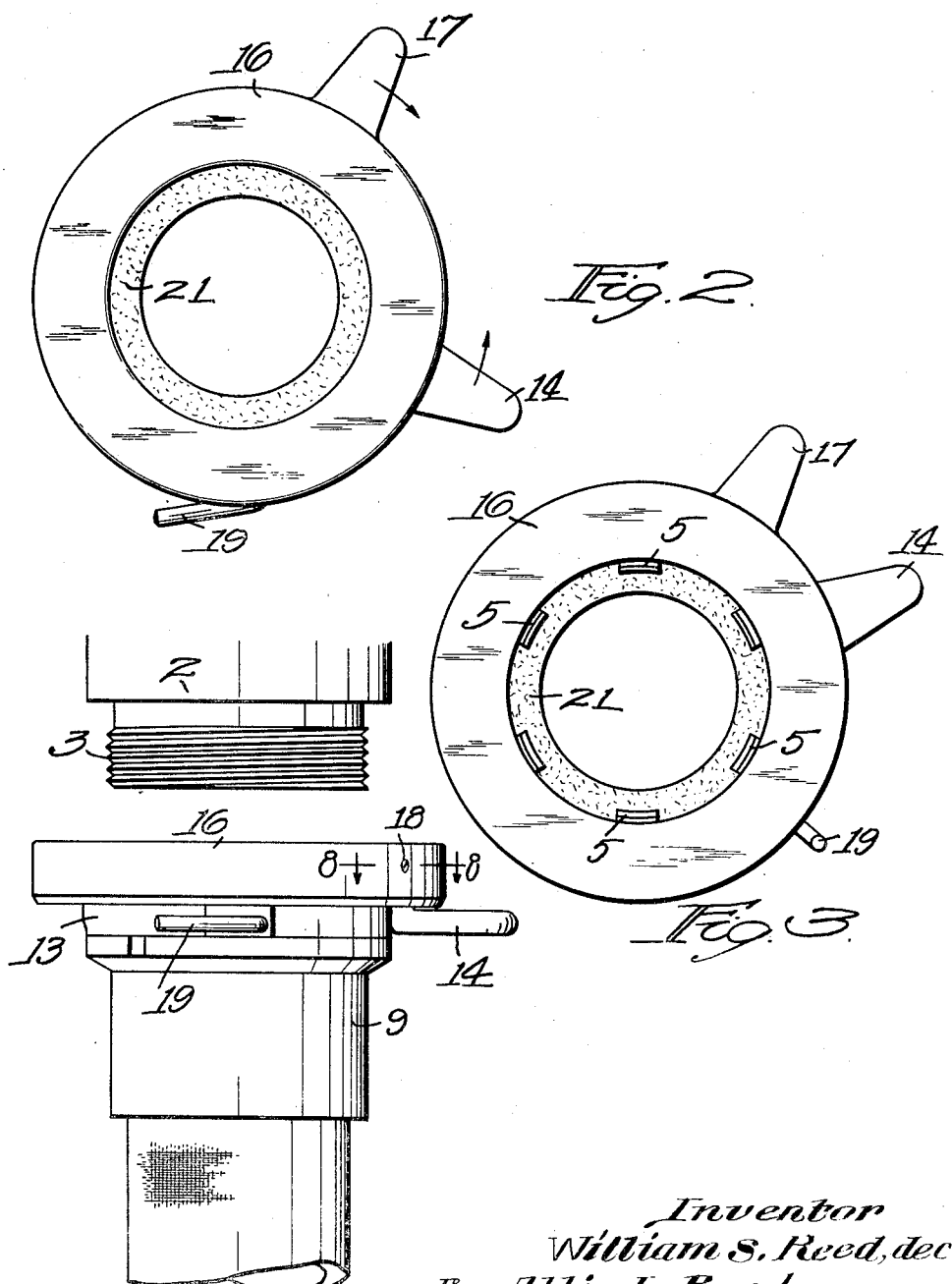
Inventor
William S. Reed, dec'd,
By Allie L. Reed,
Executrix.

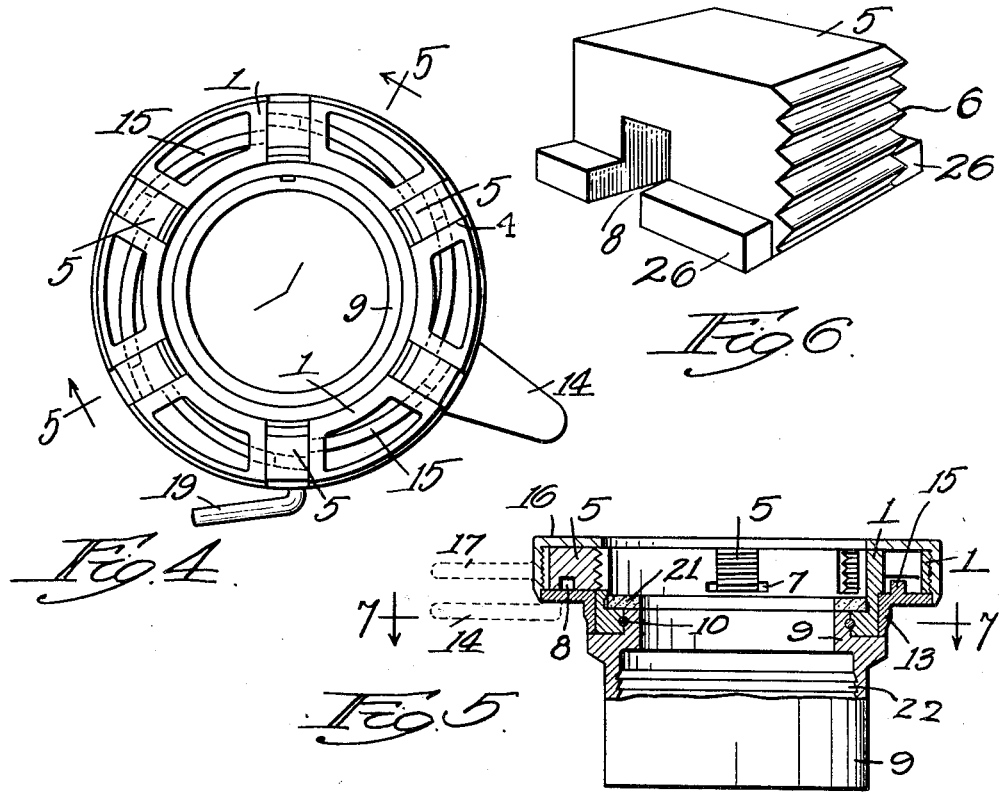
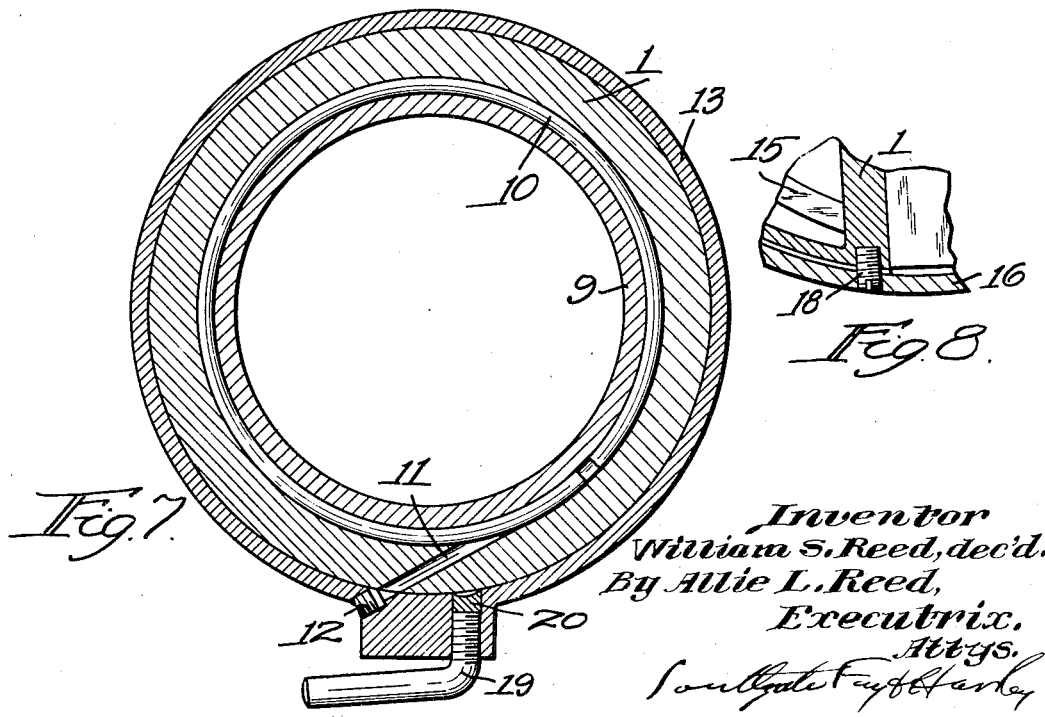

Aug. 1, 1933.                    W. S. REED                    1,920,524
                                  COUPLING
                    Original Filed Sept. 3, 1929     3 Sheets-Sheet 3

Inventor
William S. Reed, dec'd.
By Allie L. Reed,
        Executrix

Patented Aug. 1, 1933

1,920,524

UNITED STATES PATENT OFFICE 1,920,524

COUPLING

William S. Reed, Deceased, Leominster, Mass., by Allie L. Reed, Executrix, Leominster, Mass.

Refiled for abandoned application Serial No. 389,926, September 3, 1929. This application April 22, 1933. Serial No. 667,512

5 Claims. (Cl. 285—150)

This invention relates to a hose coupling particularly adapted for use as a suction coupling, but capable of general use, and is a refiling of abandoned application Serial No. 389,926, filed Sept. 3, 1929.

The usual coupling of this type comprises a female member provided with swinging jaws, screw-threaded in the inside, so as to permit the two members of the coupling to be coupled quickly by merely inserting the male member into the female member longitudinally and yet operating to prevent their accidental separation except by unscrewing.

The principal objects of this invention are to provide means whereby the screw-threaded jaws are slidingly mounted; to provide a positive operating means therefor that will positively hold the jaws in a position to prevent the removal of the other member of the coupling and to provide the coupling with two handles by which it can be manipulated efficiently and conveniently to set or unlock the jaws and to provide a coupling that will fit threads on diameters of different sizes even with different standards of threads.

Other objects and advantages of the invention will appear hereinafter.

Reference is to be had to the accompanying drawings in which

Fig. 1 is a side view of a coupling member constructed in accordance with this invention, with the cooperating male member slightly separated therefrom;

Fig. 2 is a plan of the coupling with the jaws retracted so as not to show;

Fig. 3 is a plan showing the jaws projected inwardly;

Fig. 4 is a plan of the main ring or coupling member with the cover removed;

Fig. 5 is a sectional view on the broken line 5—5 of Fig. 4;

Fig. 6 is a perspective view of one of the jaws;

Figs. 7 and 8 are enlarged sectional views on the lines 7—7 of Fig. 5 and 8—8 of Fig. 1.

Figure 9:
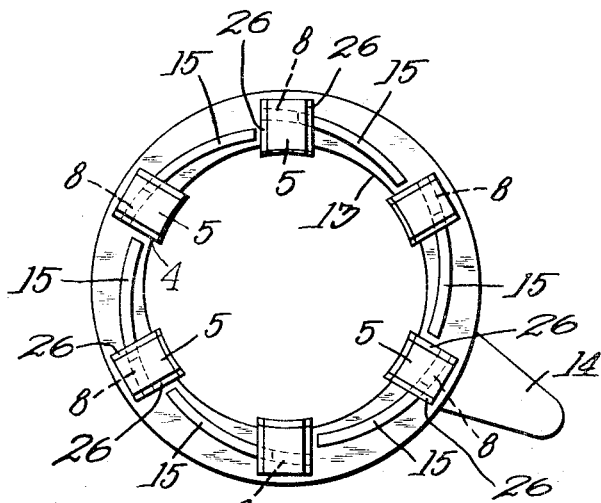

Fig. 9 is a plan of the cam ring and jaws, and

Figure 10:
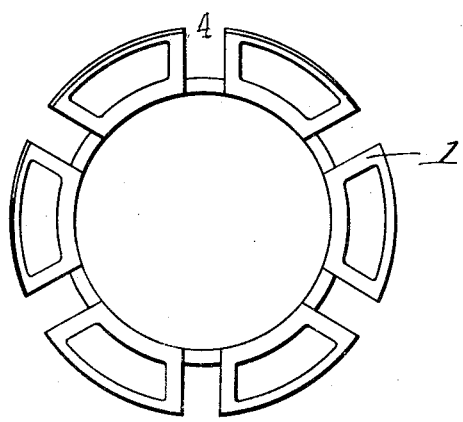

Fig. 10 is a plan of the body member of the coupling.

A disadvantage of the former constructions was that the jaws were held out into contact with the screw member only by spring pressure. Therefore, if the threads got worn there might be a possibility of the male member being pulled out of the coupling member. In order to avoid this, there is provided means for positively operating and holding all the jaws inward, thus preventing the above mentioned possibility, even when the device is much worn. This is particularly valuable in a large suction socket and for other purposes.

The coupling member or head 1 is the part to which this invention is applied. The member 2 is the male member on the hydrant or engine or it may be a hose from which the water is to be drawn. The coupling member 1 is provided with a cylindrical wall having a plurality of radial parallel sided slots 4 in which are slidably mounted jaws 5, having screw teeth 6, formed on their inner faces. These screw teeth form part of a continuous screw-thread to fit the thread 3 on the coupling member 2. The jaws have opposite parallel flanges 26 that fit in undercut recesses along the slots 4 to prevent the tilting of the jaws under high pressure and prevent the jaws pressing against the cover ring 16. The said undercut recesses 7 are located in what I have called the female member 1 of the coupling. The jaws 5 also have slots 8 in the bottom.

The member 1 extends below and is provided with a half circular circumferential groove on its inner cylindrical surface matching with a similar groove on the outside of the lower member 9. In this groove is inserted a wire 10 through a passage 11 which is closed by a screw 12. This holds the members 1 and 9 together with a swiveled connection. The member 9 has a cylindrical extension at its end which is provided with internal grooves 22 for receiving and holding a hose, preferably the suction hose of an engine. This is fixed in it in any ordinary way. Of course this end can be made in any usual way to receive a male or female coupling member.

The body member 9 has a flat circular shoulder which supports the member 1 and also a cam ring 13. This ring fits against the member 1 on the outside of the latter and is capable of turning thereon, being turned by a handle 14. It is provided with a series of spiral cams 15, the same shape as the grooves 8, but longer, and fitting therein. The turning of this ring therefore will move the jaws out and in positively and when they are projected inwardly, as shown in Fig. 3, they are practically locked in that position by the cams and there is no danger of their being pushed back into the position shown in Fig. 5 and Fig. 2 accidentally.

On the end of the female member 1 is a cap 16 which is open inside on the same diameter as the member 1 and flush with the inner cylindrical opening therein. On the outside it fits that member and they have an intermeshing screw-thread by which the cover, through its handle 17, can be removed from the inner member. After being screwed up to the closed position shown in Fig. 5 the two parts 1 and 16 are held against unscrewing by a screw 18. Also the ring 13 is held in fixed position after it has been turned in to project the jaws by a handle screw 19 located on the ring 13 and a shoe 20 inside which is forced by the screw against the circumference of the member 1 to hold them in that position. This, of course, also furnishes a positive lock to prevent the turning of the ring 13 by vibration or the like.

It will be noticed that the member 1, between the slots in which the jaws work, is of a hollow construction for reducing the weight of the coupling. Another feature is the provision of packing 21 consisting of a flat rubber ring or gasket which rests on the shoulder formed by the top of the member 9 and a horizontal circular shoulder on the member 1. This ring therefore covers the joint between these two members and prevents leakage through that joint as well as leakage past the screw-threaded end 3 which screws down on this packing.

In the operation of the device it will be understood that the member 9 is secured to the end of a hose which projects inside it and which is the suction hose of the engine preferably. The parts being in the position shown in Figs. 1 and 10, the two handles 14 and 17 are moved in the direction of the two arrows in Fig. 2 or either one is moved in the proper direction. This is possible because the members which support them are both swiveled so as to turn with comparative ease. The screw-threaded end 3 of the male member of the device 2, which preferably has a hose or pipe connected with the water supply, is introduced into the opening in the end of the coupling and forced against the packing 21. The turning of these handles then, or one of them, will project the jaws 5 and if they do not fit directly in the screw-threads the whole coupling can be turned a little until they do. Then the two parts 1 and 2 are connected together and in screw-threaded relation but without having to rotate the coupling.

This is a very quick and practically instantaneous way of connecting two members. The handle 14 being turned around until stopped by the fact that the screw-threaded jaws have entered full into the screw-threads 3 and 6, the handle 19 is turned to clamp the parts 1 and 13 together in stationary relationship. This positively locks these parts together. The uncoupling will be the reverse operation, as will be obvious.

The cap 16 can be removed by loosening the screw 18 and unscrewing the cap by means of its handle. This exposes the interior of the device in the condition shown in Fig. 4.

This constitutes an instantaneous and positive coupling particularly desired for large hose or pipes and more specifically intended for the suction hose on a fire engine. The parts are strong and practical and the jaws do not depend on any springs for forcing them in or holding them in position. There is no danger of uncoupling accidentally and the whole construction is simple and comparatively inexpensive. The jaws 5 cannot tilt back under heavy pressure on the circumference on account of the recess 7 and projections 26 and press against the cover.

This furnishes a very quick, safe, and easy means for moving connection with a pump or hydrant. Time is saved on the early starting of a fire, which is very important. The quick disconnection of this device, when a fire comes too near, enables the men to avoid falling walls at times and to move to another place where there is a water supply. Much time is saved and the tedious labor of unscrewing is avoided.

Although only one form of the invention is illustrated and described herein, it will be evident that modifications can be made therein by any person skilled in the art, without departing from the scope of the invention as expressed in the claims. Therefore, the inventor does not wish to be limited in this respect, but what is claimed is:—

1. A coupling, comprising a body member, and a head member swiveled thereon, said head member being provided with vertical radial open-topped slots in its walls, a series of jaws located in said slots, cams under said jaws to force them inwardly, means to actuate said cams, said jaws having teeth thereon constituting a part of a continuous screw-thread around the coupling member, the jaws having slots for receiving said cams and having lateral projections along the side and said coupling member having slots for said projections to prevent all tendency of the jaws to tilt and to remove the pressure of the jaws against the cap.

2. A circular coupling, comprising a body member, and a head member swiveled thereon, said head member being provided with radial slots in its wall, jaws located in said slots and slidably mounted, the jaws being provided with parts of the same screw-thread on their inner surfaces, a ring rotatably mounted on said head and having curved cams fitting curved slots in the jaws for positively moving the jaws out and in and locking them in, and means for locking said ring against movement relative to the head.

3. A coupling, comprising a body member, and a head member swiveled thereon, said head member having radial slots, internally screw-threaded jaws slidingly mounted in said slots, a cap for closing the top of the head member beyond said slots adapted to screw on the outside of said coupling member, a ring rotatably mounted on said head member and having cam projections for engaging said jaws and moving them when the ring is turned, and handles on the cam ring and cap for use in causing a relative turning motion between the ring and coupling member.

4. A coupling member provided with vertical radial open-topped slots in its walls, a series of jaws located in said slots, a series of cams under said jaws in a single plane to force them inwardly, said jaws having teeth thereon constituting a part of a continuous screw-thread around the coupling member, a cap attached by screw threads at the end of the coupling member and projecting over the end thereof to seal it from the entrance of water and means for positively holding the cap in position after it is screwed down.

5. A coupling for a hose comprising a body member, and a head member swiveled thereon, said head member having radial slots, jaws slidably mounted in said slots and having parts of a continuous screw-thread on their inner surfaces, said jaws having curved slots in the bottom thereof and a cam ring rotatably mounted on said head member under said jaws and having curved cams projecting into said slots and fitting the slots, whereby said cams constitute means for positively holding the jaws in any position to which they may be moved by the cams, and a brake mounted in said head member for engagement with said ring.

ALLIE L. REED,
*Executrix of the Estate of William S. Reed.*